United States Patent [19]

Fischer et al.

[11] Patent Number: 4,744,683
[45] Date of Patent: May 17, 1988

[54] REVOLVING ENDLESS BANDS COMPRISING MEANS FOR COMPENSATING FOR A DISPLACEMENT PERPENDICULAR TO THEIR DIRECTION OF MOVEMENT

[75] Inventors: Ludwig Fischer, Herrenberg; Gottfried Goldrian, Boblingen; Volker Zimmermann, Sindelfingen, all of Fed. Rep. of Germany

[73] Assignee: International Business Machines Corporation, Armonk, N.Y.

[21] Appl. No.: 19,466

[22] Filed: Feb. 26, 1987

[30] Foreign Application Priority Data

Mar. 25, 1986 [EP] European Pat. Off. ...... 86 104 057.4

[51] Int. Cl.$^4$ .............................................. B41J 1/20
[52] U.S. Cl. .................................... 400/146; 101/111; 101/93.13
[58] Field of Search ............... 400/146, 147, 148, 134, 400/240.4; 101/111, 93.13, 93.14

[56] References Cited

U.S. PATENT DOCUMENTS

| | | | |
|---|---|---|---|
| 3,052,408 | 9/1962 | Cunningham et al. | 235/61.11 |
| 3,221,302 | 11/1965 | Silverberg | 340/146.3 |
| 3,828,669 | 8/1974 | Bonafino et al. | 101/111 |
| 4,064,800 | 12/1977 | Paccione et al. | 400/146 |
| 4,588,882 | 5/1986 | Buxton | 235/487 |

FOREIGN PATENT DOCUMENTS 0029676  2/1983  Japan .................. 400/146

*Primary Examiner*—Edgar S. Burr
*Assistant Examiner*—James Lisehora
*Attorney, Agent, or Firm*—Curtis G. Rose; J. S. Gasper; M. H. Klitzman

[57] ABSTRACT

A type band for a printer comprises a track of marks to be scanned (timing marks) at least one of which is obliquely positioned relative to its adjoining marks. The centers of all marks are equidistantly spaced. When the horizontally moving type band is vertically displaced, the time spacing of the scanning signal of the obliquely positioned timing mark is changed over the scanning signal of its adjacent timing mark. The magnitude of the vertical displacement of the type band is derived from the change in this time spacing. The displacement data thus obtained permit compensating for the vertical displacement of the type band (using, for instance, a stepper motor).

6 Claims, 3 Drawing Sheets

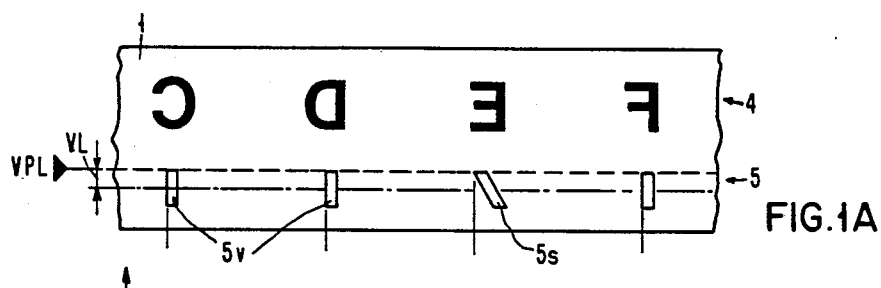
FIG.1A
FIG.2A
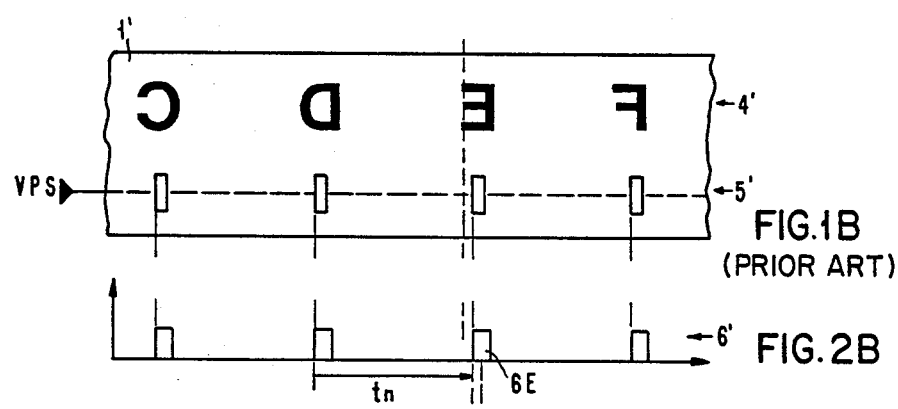
FIG.1B
(PRIOR ART)
FIG.2B
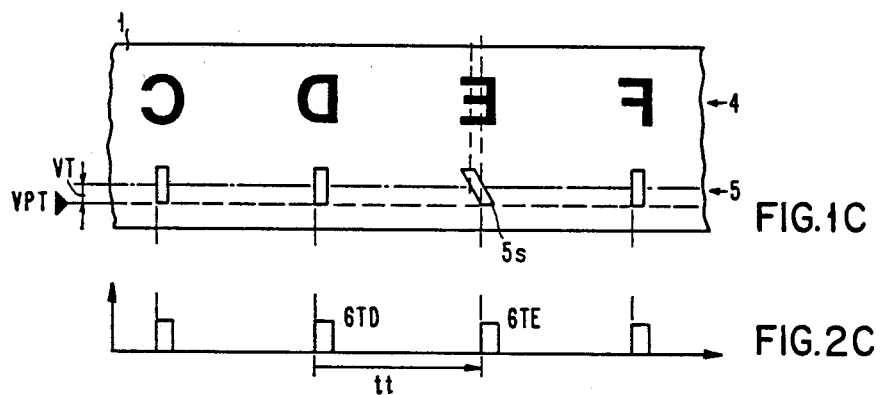
FIG.1C
FIG.2C

REVOLVING ENDLESS BANDS COMPRISING MEANS FOR COMPENSATING FOR A DISPLACEMENT PERPENDICULAR TO THEIR DIRECTION OF MOVEMENT

FIELD OF THE INVENTION

The invention relates to the measurement of vertical displacement of a horizontally revolving endless band with a track of marks to be scanned (timing marks). In addition, the invention concerns means for compensating for such an undesired displacement. More particularly, this invention relates to measuring such an undesired displacement in impact printers with a horizontally revolving type band, with means provided for compensating for the displacement.

DESCRIPTION OF THE RELATED ART

When an endless band, such as a type band for a printer, rotates through a series of pulleys, displacement of the band perpendicular to its direction of movement can occur. This displacement causes poor printer quality, since the characters printed float up and down with the displacement of the band. To ensure that the lines are properly aligned, that the characters are uniformly spaced and that the print hammers are accurately aligned to the character track, vertical displacements of a horizontally revolving type band must be detected and suppressed.

In IBM printer 4245, the type band is held in a defined vertical position by slightly adjusting the axis of the type band guide and drive pulley, respectively. Ball bearings act as a stop for the lower end of the type band. The accuracy of this approach is however limited and the axial adjustment is very difficult.

In other printers, for instance, IBM 4248, the vertical position of the type band is determined by a control system, using a special position sensor for measuring the vertical position of the type band. The position of the type band is determined depending upon its deviation from the desired vertical position However, using special position sensors solely for sensing vertical displacement is inefficient and costly to implement.

Type bands of impact printers commonly contain timing marks to provide correct horizontal positioning of characters. However, these timing marks are unusable to detect vertical displacement of the type band.

It is therefore desirable to have timing marks on a type band that can also be used to detect vertical displacement of the type band.

SUMMARY OF THE INVENTION

It is the principal object of the invention to measure the position of a revolving endless band perpendicular to its direction of movement.

It is another object of the invention to measure the position of a revolving endless type band in a printer perpendicular to its direction of movement using the type band's time mark track, thus eliminating the need for an additional position sensor.

These and other objects are accomplished by the type band and compensating means disclosed herein. The type band contains timing marks, at least one of which is obliquely positioned relative to its adjoining marks. The centers of all marks are equidistantly spaced. When the horizontally moving type band is vertically displaced, the time spacing of the scanning signal of the obliquely positioned timing mark is changed over the scanning signal of its adjacent timing mark. The magnitude of the vertical displacement of the type band is derived from the change in this time spacing. The displacement data thus obtained permit compensating for the vertical displacement of the type band (using, for instance, a stepper motor).

BRIEF DESCRIPTION OF THE DRAWING

FIG. 1A is a sectional diagrammatic representation of a type band with an oblique timing mark, the type band in a position displaced downward.

FIG. 1B is a sectional diagrammatic representation of a conventional type band in a desired vertical position (prior art).

FIG. 1C is a sectional diagrammatic representation of a type band with an oblique timing mark, the type band in a position displaced upward.

FIGS. 2A, 2B, 2C are diagrammatic representations of the scanning signals associated with the type band according to FIGS. 1A, 1B and 1C.

DESCRIPTION OF THE PREFERRED EMBODIMENT

Figure 5:
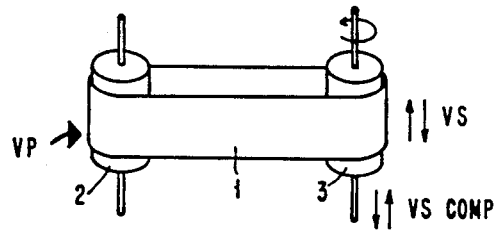
FIG. 5 is a diagrammatic perspective representation of a revolving type band with a guide and a drive pulley (prior art).

A type band in a typical impact printer is generally led over a drive pulley 2 and a guide pulley 3, as shown in FIG. 5. This may lead to undesired vertical displacements of the band in the direction VS and in the direction opposite thereto. These undesired vertical displacements must be compensated by oppositely directed compensatory displacements VS COMP.

Type band 1 of an impact printer generally comprise a character track 4' and a timing mark track 5' associated therewith (FIG. 1B). These timing marks may be scanned electromagnetically or by other conventional means. When the timing marks are scanned by a sensor at a desired vertical position VP (FIG. 5), scanning signals 6 are generated from which the occurrence of particular characters at particular print positions may be derived. This information is necessary to indicate to the printer control the time at which a particular character will be at a particular print line position. Such data are a prerequisite for printing a desired character at a particular position of the record carrier.

FIG. 1B is a sectional diagrammatic representation of a conventional type band 1' in a desired vertical position. The timing marks in track 5' are normally scanned in a desired vertical position of the band designated as VPS. This vertical position is aligned in the vertical to the center of the timing marks. When the band is vertically displaced downward by VL (FIG. 1A), the timing marks are scanned in the vertical position VPL. The position of the timing mark sensor remains unchanged when the band is displaced. There is however a relative vertical displacement between the timing mark sensor and the type band. Scanning is effected in the upper region of the timing marks (broken line) (FIG. 1A) rather than centrally as in FIG. 1B. An upward displacement of the band (FIG. 1C) by VT causes the timing marks to be scanned at position VPT (broken line), which means that the lower mark regions are scanned.

According to the prior art shown in FIG. 1B, the timing marks are positioned in a horizontal track 5'. Each timing mark also extends in the vertical direction. With such an arrangement of the timing marks, vertical displacements of the band cannot be derived from the scanning signals. FIGS. 2A, 2B and 2C show a diagrammatic representation of the scanning signals associated with the type band of FIGS. 1A, 1B and 1C. Equidistant timing marks, as shown in FIG. 1B, lead to scanning signals 6' whose mutual time spacing is equal, amounting to tn. The leading edge of the scanning signals is derived from the leading edge of the timing marks.

According to the invention, one of the timing marks 5s is obliquely positioned in the horizontal track 5, as shown in FIG. 1A and 1C, respectively. In the preferred embodiment, this oblique timing mark is associated with the character E, although in practice, it could be associated with any character, or even multiple characters. The effect of its obliqueness (see FIG. 1A in conjunction with FIG. 2A) is that when scanning is effected along position VLP, the scanning signal is generated earlier than in FIG. 1B. The spacing of the scanning signal 6LD, associated with the character D, and the scanning signal 6LE, associated with the character E, is designated as tl for a vertical displacement of the band according to FIG. 1A. In the case of a vertical displacement of the band according to FIG. 1C, scanning signal 6TE, associated with character E, occurs later than in FIG. 1B. The spacing of scanning signal 6TD, associated with the character D, and scanning signal 6TE is designated as tt. If the vertical displacement of the type band with the obliquely positioned timing mark for the character E amounted to zero, the signal spacing would be tn (as in FIG. 1B). For that purpose, it is assumed that the leading edge of the oblique timing mark at position VPS coincides with the leading edge of the assumed vertically aligned timing mark. The occurrence of scanning signals 6LE and 6TE at different times is due to the fact that in the former case, the sensor at the level of position VPL senses the leading edge of the oblique timing mark 5s earlier than in the latter case.

Therefore, the amount of vertical displacement may be derived from the time spacing of the scanning signal of the obliquely positioned timing mark and the scanning signal of an adjacent not obliquely positioned timing mark. If the timing mark is rectilinearly oblique, the time difference of the scanning signals and the magnitude of the band's vertical displacement are linearly related. They would be non-linearly related with a curved timing mark, for example.

Figure 3:
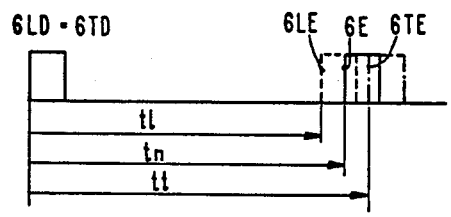
FIG. 3 is a sectional diagrammatic representation of the time spacing between the scanning signals of the oblique timing mark and its adjacent timing mark in different vertical positions.

FIG. 3 shows a sectional diagrammatic representation of the time spacing between the scanning signals of the oblique timing mark in different vertical positions and the adjacent timing mark.

The scanning signals essential for determining the vertical displacement in the cases according to FIGS. 2A, 2B and 2C are shown in a single time diagram in FIG. 3.

Figure 4:
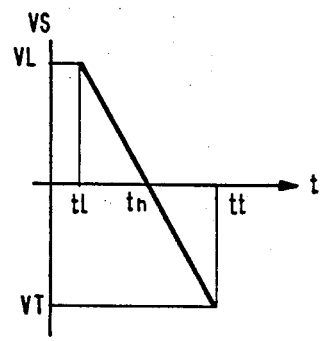
FIG. 4 shows the vertical displacement as a function of the time spacing between the time signals of the oblique timing mark and its adjacent timing mark in different vertical positions.

FIG. 4 shows the vertical displacement VS as a function of the time spacing t between the scanning signals of the oblique timing mark in different vertical positions and its adjacent timing mark. The designations tl, tn and tt in FIG. 4 are identical with those used in FIGS. 2A, 2B, 2C or FIG. 3. Designations VL and VT are identical with those of FIGS. 1A and 1C. The functional curve shows that in the absence of a vertical displacement VS=0 the solid line intersects the abscissa at the value tn. The abscissa values at tl and tt correspond to the coordinate values VL and VT, respectively, with which they are associated. Thus, for each value between tl and tt, the associated vertical displacement may be determined on the basis of the linear relation of the function $VS=f(T)$ (e.g. by a counter run for the respective time value). Thus, knowledge of this value permits compensating for the band's vertical displacement by an opposite value of the same magnitude.

Figure 6:
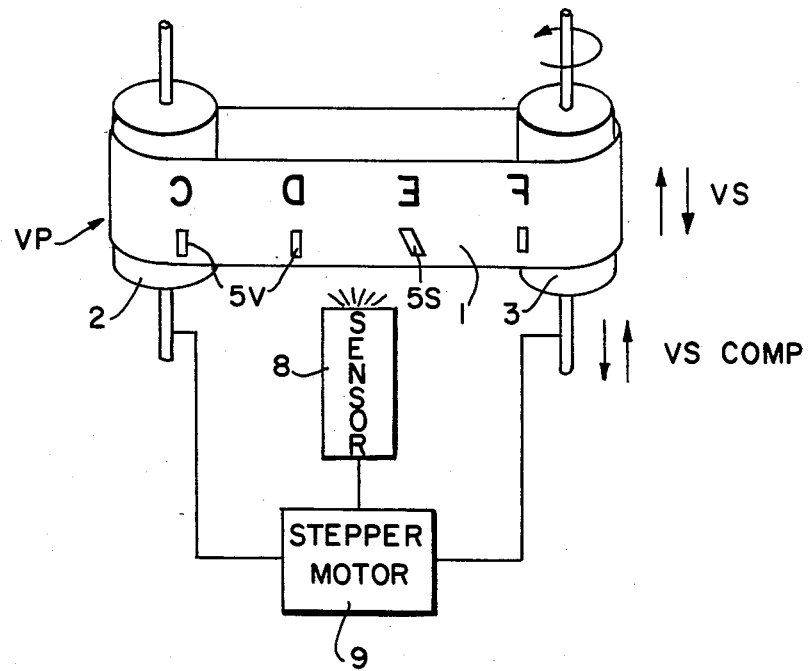
FIG. 6 is a diagrammatic perspective representation of the type band of the subject invention revolving around drive pulleys, the type band's timing marks being sensed by a sensor which controls a stepper motor for assuring proper vertical positioning of the type band.

For that purpose, as indicated in FIG. 6, sensor 8 senses marks 5v and 5s. If sensor 8 detects that band 1 is displaced vertically, stepper motor 9 adjusts the band drive and guide pulley mechanism 2 and 3 by a compensatory value which is opposite to the vertical displacement of the type band.

While the invention has been described with respect to a preferred embodiment thereof, it will be understood by those skilled in the art that various changes in detail may be made therein without departing from the spirit, scope, and teaching of the invention. Accordingly, the herein disclosed is to be limited only as specified in the following claims.

We claim:

1. A rotatable endless band, including means to detect both timing and positioning of said band, said means comprising:
    at least three sensor marks wherein a first sensor mark is obliquely positioned relative to its adjoining sensor marks, the center of said first sensor mark being equidistantly spaced from the centers of said adjoining sensor marks,
    said adjoining sensor marks positioned parallel to each other and perpendicular to said band's direction of rotation,
    said sensor marks capable of being sensed to assure proper timing,
    said sensor marks also capable of being sensed to assure proper positioning of said band perpendicular to its direction of rotation.

2. The endless band of claim 1, further comprising:
a plurality of characters.

3. An endless band system, comprising:
a plurality of pulleys;
an endless band, positioned over said pulleys and capable of being rotatably driven by said pulleys, said endless band including means to detect both timing and positioning of said band, said means comprising at least three sensor marks wherein a first sensor mark is obliquely positioned relative to its adjoining sensor marks, the center of said first sensor mark being equidistantly spaced from the centers of said adjoining sensor marks,
    said adjoining sensor marks positioned parallel to each other and perpendicular to said band's direction of rotation;

sensor means, responsive to said plurality of sensor marks, for sensing the timing of said endless band when rotating around said pulleys, and for sensing the positioning of said endless band over said pulleys perpendicular to said band's direction of rotation, said sensor means generating a first output signal if said perpendicular positioning is incorrect, said sensor means generating a second output signal if said perpendicular postioning is correct, and compensating means, responsive to said first output signal, for compensating for said incorrect perpendicular positioning.

4. The endless band system of claim 3, wherein said compensating means is a stepper motor.

5. A printer system, comprising:
a plurality of pulleys;
an endless type band, positioned over said pulleys and capable of being rotatively driven by said pulleys, said endless type band including means to detect both timing and positioning of said band, said means comprising at least three sensor marks wherein a first sensor mark is obliquely positioned relative to its adjoining sensor marks, the center of said first sensor mark being equidistantly spaced from the centers of said adjoining sensor marks, said type band further comprising a plurality of characters, said adjoining sensor marks positioned parallel to each other and perpendicular to said band's direction of rotation;

sensor means, responsive to said plurality of sensor marks, for sensing the timing of said endless band when rotating around said pulleys, and for sensing the positioning of said endless band over said pulleys perpendicular to said band's direction of rotation, said sensor means generating a first output signal if said perpendicular positioning is incorrect;

said sensor means generating a second output signal if said perpendicular positioning is correct; and compensating means, responsive to said first output signal, for compensating for said incorrect perpendicular positioning.

6. The endless band system of claim 5, wherein said compensating means is a stepper motor.

* * * * *